(12) United States Patent
Gong et al.

(10) Patent No.: US 9,077,912 B2
(45) Date of Patent: Jul. 7, 2015

(54) MOTION INITIATED TIME SYNCHRONIZATION

(75) Inventors: Michelle X. Gong, Sunnyvale, CA (US); Roy Want, Los Altos, CA (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 12/888,832

(22) Filed: Sep. 23, 2010

(65) Prior Publication Data

US 2012/0075439 A1    Mar. 29, 2012

(51) Int. Cl.
- *H04N 5/04* (2006.01)
- *H04N 5/247* (2006.01)
- *H04N 13/02* (2006.01)

(52) U.S. Cl.
CPC ............ *H04N 5/247* (2013.01); *H04N 13/0239* (2013.01); *H04N 13/0296* (2013.01)

(58) Field of Classification Search
CPC .......... H04N 13/0051; H04N 13/0282; H04N 5/247; H04N 13/239; H04N 13/296
USPC ........................................................ 348/500
See application file for complete search history.

(56) References Cited

U.S. PATENT DOCUMENTS

| | | | |
|---|---|---|---|
| 4,251,801 A | 2/1981 | Le Mair et al. | |
| 6,014,376 A | 1/2000 | Abreu et al. | |
| 6,069,887 A | 5/2000 | Geiger et al. | |
| 6,236,623 B1 | 5/2001 | Read et al. | |
| 8,339,363 B2 * | 12/2012 | Krum et al. | 345/158 |
| 8,755,785 B2 | 6/2014 | Gong et al. | |
| 2003/0045303 A1 | 3/2003 | Oda et al. | |
| 2005/0093868 A1 * | 5/2005 | Hinckley | 345/502 |
| 2005/0125098 A1 | 6/2005 | Wang et al. | |
| 2006/0030343 A1 | 2/2006 | Ebner et al. | |
| 2006/0123297 A1 | 6/2006 | Reichert et al. | |
| 2007/0153090 A1 | 7/2007 | Liow et al. | |
| 2007/0223428 A1 | 9/2007 | Patterson et al. | |
| 2008/0070550 A1 | 3/2008 | Hose | |
| 2008/0170592 A1 | 7/2008 | Hack | |
| 2008/0216125 A1 | 9/2008 | Li et al. | |
| 2009/0092154 A1 * | 4/2009 | Malik et al. | 370/480 |
| 2010/0141763 A1 | 6/2010 | Itoh et al. | |

(Continued)

FOREIGN PATENT DOCUMENTS

| | | |
|---|---|---|
| EP | 1 416 648 A1 | 5/2004 |
| JP | 2004-289584 A | 10/2004 |
| JP | 2006-504307 A | 2/2006 |

(Continued)

OTHER PUBLICATIONS

Gong, Michelle X., et al., "Motion Initiated Time Synchronization", International Search Report and Written Opinion received for PCT Application Serial No. PCT/US2011/053089, received Apr. 9, 2012, 8 pages.

(Continued)

*Primary Examiner* — Richard Torrente
(74) *Attorney, Agent, or Firm* — Jordan IP Law, LLC

(57) ABSTRACT

Systems and methods of synchronizing devices may include detecting a movement of a first mobile device and conducting a time synchronization procedure with respect to a second mobile device in response to the movement of the two mobile devices. The time synchronization can be conducted without network infrastructure support at the mobile devices.

17 Claims, 3 Drawing Sheets

(56) References Cited

U.S. PATENT DOCUMENTS

2011/0040997 A1 2/2011 Baumgartl et al.
2013/0301634 A1 11/2013 Ehlers et al.

FOREIGN PATENT DOCUMENTS

| JP | 2007-013704 A | 1/2007 |
| JP | 2007-166278 A | 6/2007 |
| JP | 2007-228554 A | 9/2007 |
| JP | 2009-188764 A | 8/2009 |
| JP | 2010-136032 A | 6/2010 |
| WO | 2012040629 A2 | 3/2012 |
| WO | 2012040629 A3 | 3/2012 |
| WO | 2012/134572 A1 | 10/2012 |

OTHER PUBLICATIONS

International Preliminary Report on Patentability Received for PCT Patent Application No. PCT/US2011/053089, mailed on Apr. 4, 2013, 5 Pages.

Office Action received for Japanese Patent Application No. 2013-528398, mailed on Dec. 24, 2013, 4 pages of Office Action including 2 pages of English Translation.

International Preliminary report on Patentability and Written Opinion received for PCT Patent Application No. PCT/US2011/066815, mailed on Oct. 10, 2013, 7 pages.

International Search Report and Written Opinion received for PCT Patent Application No. PCT/US2011/066815, mailed on Jun. 12, 2012, 10 pages.

* cited by examiner

MOTION INITIATED TIME SYNCHRONIZATION

BACKGROUND

1. Technical Field

Embodiments generally relate to conducting time synchronizations. In particular, embodiments relate to motion triggered time synchronizations.

2. Discussion

Images from multiple digital cameras may be compiled together to generate a higher quality picture (e.g., via super resolution), to capture a stereo image pair across two independent cameras, or to generate a 3-D (three dimensional) model from pictures taken with several cameras at the same time. Time synchronization can be used to ensure that image data from the same instance in time is taken from each camera when reconstructing a given scene, particularly if the captured scene includes moving objects. In reality, however, different cameras typically do not share the same time reference and each camera has an independent and free-running oscillator. Accordingly, time-stamps from different cameras might not be useful when combining pictures unless a network-based time reference is available.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for an apparatus including a sensor to detect a movement of a first mobile device, and a synchronization module to conduct a time synchronization with respect to a second mobile device in response to the movement of the first mobile device. The time synchronization can be conducted without network infrastructure support at the first mobile device.

Embodiments may also include a system having a sensor to detect a movement of a first mobile device, and a synchronization module to conduct a time synchronization in response to the movement of the first mobile device. The time synchronization can be conducted without network infrastructure support at the first mobile device. The system can also include an image capture module to capture an image and apply a time stamp to the image based on the time synchronization.

Other embodiments can include a computer readable storage medium having a set of instructions which, if executed by a processor, cause a first mobile device to detect a movement of the first mobile device, and conduct a time synchronization with respect to a second mobile device in response to the movement of the first mobile device. The time synchronization may be conducted without network infrastructure support at the first mobile device.

Figure 1:
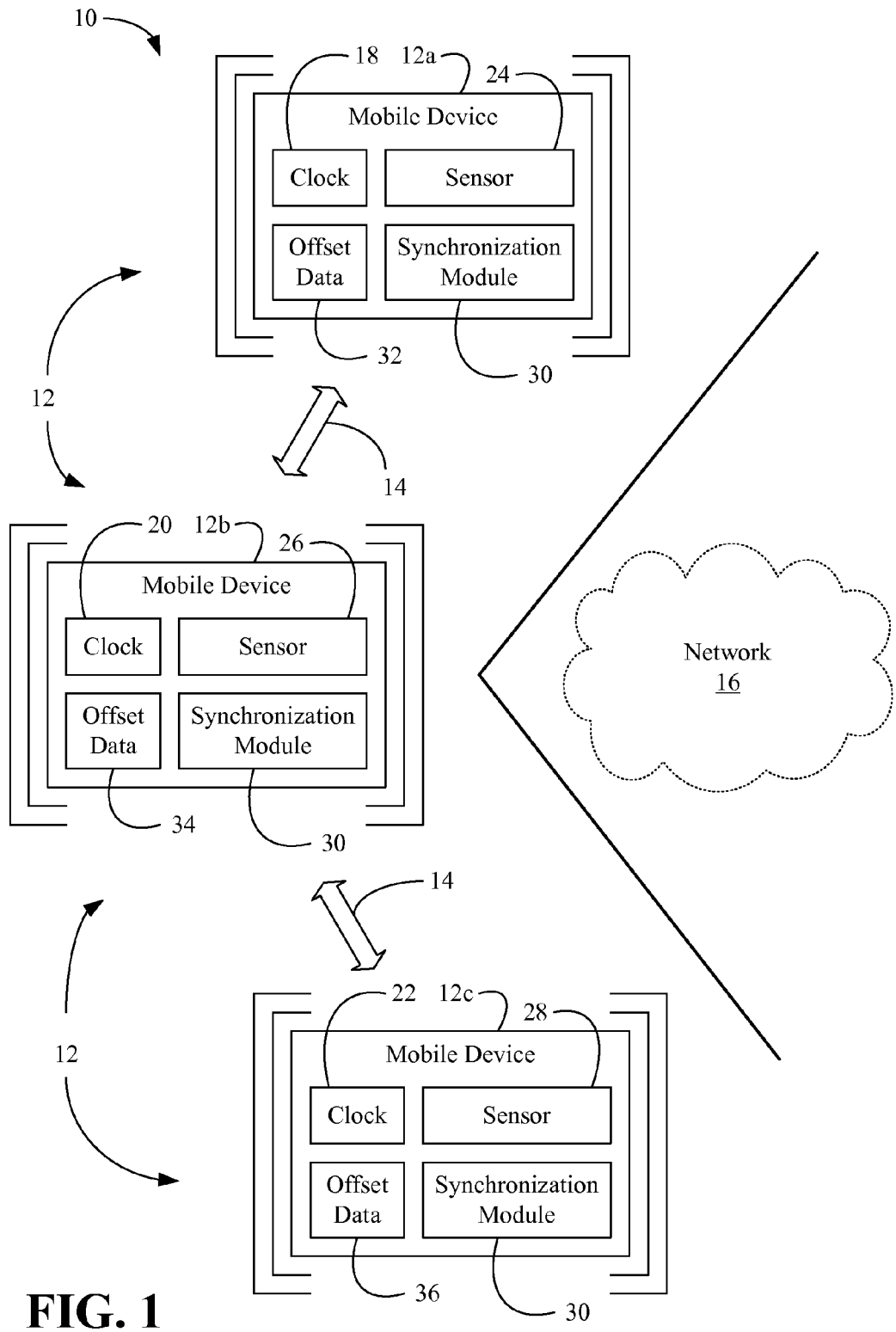
FIG. 1 is a block diagram of an example of a time synchronization environment according to an embodiment.

FIG. 1 shows an environment 10 in which a plurality of mobile devices 12 (12a-12c) conduct peer-to-peer time synchronizations 14 (e.g., using a peer-to-peer wireless interface) with one another without accessing a network (e.g, access point, base station, cellular network infrastructure) 16 or otherwise common time reference. The mobile devices 12 might include or be part of cameras, mobile Internet devices (MIDs), personal digital assistants (PDAs), wireless smart phones, media players, notebook computers, electronic book readers, or any combination thereof, wherein knowledge of the offset between internal clocks 18, 20, 22 of the individual devices 12 may be advantageous. For example, in the case of an image (still or video) capture application, the clock offsets could be used to reconstruct time dependent scenes captured by the mobile devices 12.

In the illustrated example, each mobile device 12 includes a sensor 24, 26, 28 to detect a movement of the mobile device 12 in three dimensions. For example, the sensor 26 of the mobile device 12b might include an accelerometer, wherein the sensor 24 of the mobile device 12a could include a gyroscope or other motion sensing component. The detected movement could be associated with a user of the device 12 shaking the device, tapping two or more of the devices 12 together, and so on, in order to trigger a time synchronization 14. Each mobile device 12 may include a synchronization module 30 to conduct a time synchronization 14 with respect to one or more other devices in response to detecting the movement. As already noted, the time synchronizations 14 can be conducted without network infrastructure support at the mobile devices 12. The clock offsets resulting from the time synchronizations 14 may be stored locally at each mobile device 12 as offset data 32, 34, 36.

Figure 2:
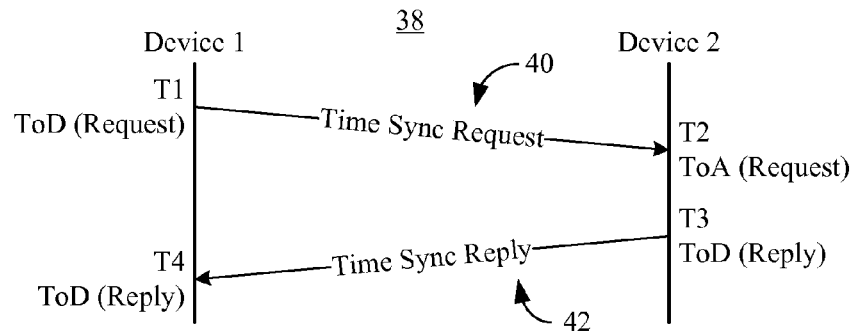
FIG. 2 is a diagram of an example time synchronization procedure according to an embodiment.

Turning now to FIG. 2, a timing diagram 38 is shown in which a first mobile device ("Device 1") conducts a time synchronization procedure with respect to a second mobile device ("Device 2") in response to a movement of the first mobile device. In the illustrated example, the first mobile device broadcasts a time synchronization request 40 that is received by the second mobile device. The time synchronization request 40 can include a time of departure ("ToD") stamp, as well as a number of other parameters. Table I below provides one example of a frame format for the time synchronization request 40.

TABLE I

| Order | Information |
| --- | --- |
| 1 | Frame Type |
| 2 | Transmitter Address |
| 3 | Receiver (Broadcast) Address |
| 4 | Dialogue Token |
| 5 | Time of Departure (ToD) Stamp |
| 6 | User Friendly Name |
| ... | ... |

The frame type may identify whether the frame is a synchronization request, a reply to a synchronization request, etc., and the transmitter address can indicate the address of the first mobile device in the illustrated example. The address could be a universally unique MAC (media access control) address, wherein the first mobile device may wait for expiration of a random or pseudo-random delay period before transmission of the synchronization request 40 to minimize the risk of collisions between requests from multiple devices. In addition, the receiver address can be a broadcast address that is monitored by other devices in the area. The dialogue token may be used to differentiate between time synchronization request frames from different devices if there are multiple transmitting devices in the area. The ToD stamp can be applied at the time the frame is transmitted (e.g., after expiration of the random delay period), and the user friendly name may be a user defined identifier/string of the first mobile device (e.g., Mike's camera). The user friendly name might enable users to more easily determine whether to accept time synchronization requests from other devices.

Upon receipt of the time synchronization request 40, the second mobile device may determine the time of arrival (ToA) of the time synchronization request 40 and identify the source of the time synchronization request 40 based on the transmitter address and/or dialogue token in the request frame. If the second mobile device has also detected local movement such as a shaking and/or bumping, a reply 42 to the time synchronization request 40 can be generated and transmitted after expiration of a random delay period. As already noted, the random delay period may be introduced so that devices receiving the same time synchronization request 40 do not reply at the same time, causing collisions. The random delay may therefore be chosen based on a uniform distribution (e.g., [0, max_delay]).

The time synchronization reply 42 can be a unicast frame that identifies the ToA of the request 40 as well as the ToD of the time synchronization reply 42. Table II below provides one example of a frame format for the time synchronization reply 42.

TABLE II

| Order | Information |
|---|---|
| 1 | Frame Type |
| 2 | Transmitter Address |
| 3 | Receiver Address |
| 4 | Dialogue Token |
| 5 | Time of Arrival (ToA) Stamp |
| 6 | Time of Departure (ToD) Stamp |
| 7 | User Friendly Name |
| ... | ... |

To further filter out unintentional time synchronization reply 42 transmissions, a signature of the movement detected at the first mobile device can be encoded into the synchronization request 40, wherein the second mobile device may compare the received movement signature with a locally generated signature corresponding to the movement detected at the second mobile device. Transmission of the synchronization reply 42 can be limited to instances in which the two signatures match to within a defined level of certainty (e.g., satisfy a predetermined relationship).

When the illustrated first mobile device receives the synchronization reply 42, it may determine the ToA of the reply 42 and calculate a clock offset for the two devices. The calculation might be conducted as follows, $$\text{Offset} = \frac{[(T2 - T1) - (T4 - T3)]}{2} \quad (1)$$

For instance, if the local clock of the first mobile device reads 1:30 pm and the offset between the local clock of the first mobile device and the clock of the second mobile device is +2 mins, the first mobile device can determine that the clock of the second mobile device is 1:32 pm. By using such an approach, one device can be synchronized to multiple devices simultaneously without using a master clock of a network. Furthermore, because the time synchronization procedure is distributed, the procedure may be faster and more efficient than for each device to copy the clock values of the other devices. Moreover, because modern clocks can have relatively high accuracy, two devices may not need to be resynchronized very often. For example, the drift between two devices having a clock accuracy of 10 ppm would be at most 1 ms for every 50 sec. Accordingly, to maintain a 1 ms accuracy, the two devices could be resynchronized every 50 seconds.

Figure 3:
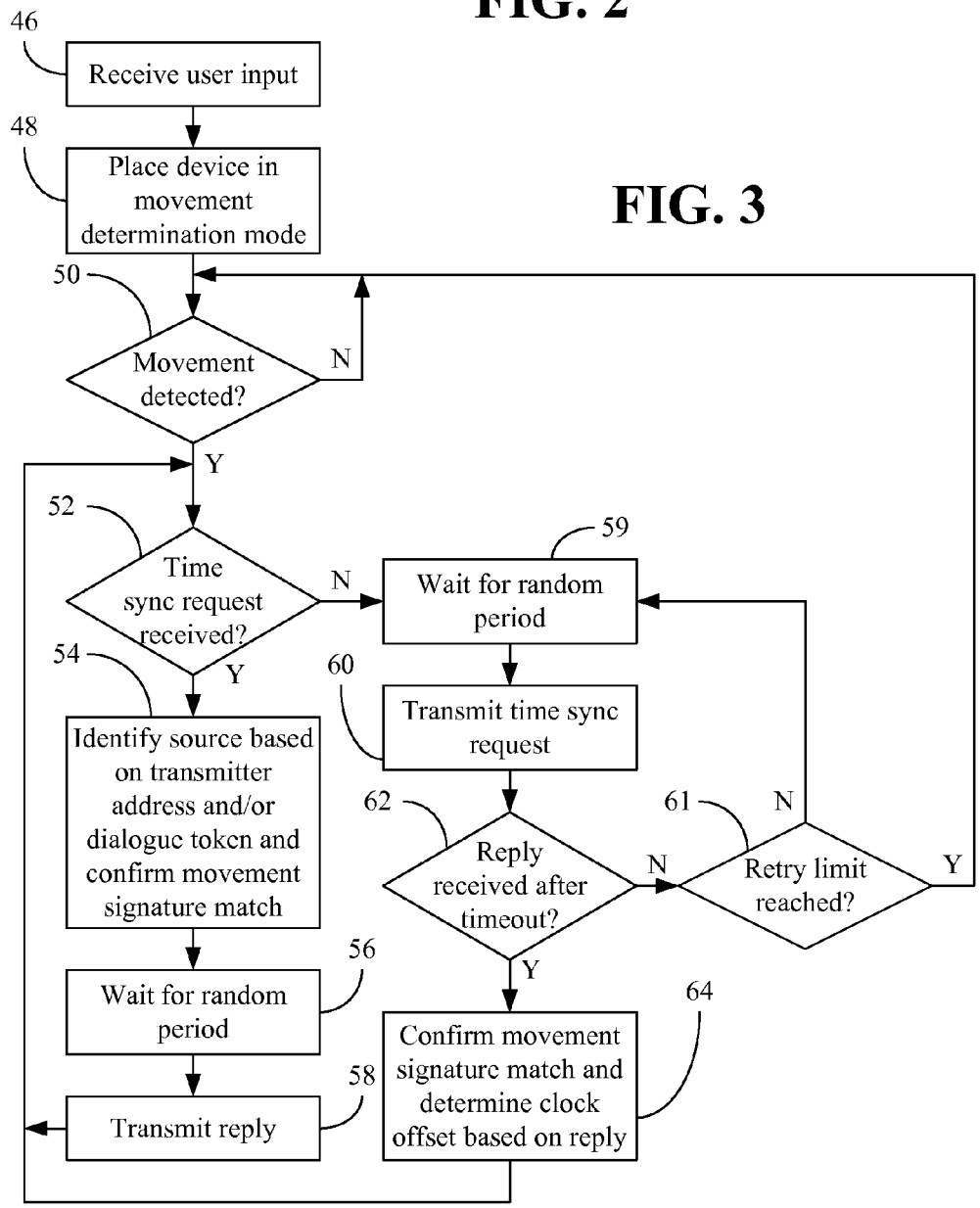
FIG. 3 is a flowchart of an example of a method of conducting a time synchronization according to an embodiment.

FIG. 3 shows a method 44 of synchronizing a local mobile device with one or more other mobile devices. The method 44 may be implemented in executable software as a set of logic/module instructions stored in a machine- or computer-readable medium of a memory such as random access memory (RAM), read only memory (ROM), programmable ROM (PROM), firmware, flash memory, etc., in fixed-functionality hardware using circuit technology such as application specific integrated circuit (ASIC), complementary metal oxide semiconductor (CMOS) or transistor-transistor logic (TTL) technology, or any combination thereof. For example, computer program code to carry out operations shown in method 44 may be written in any combination of one or more programming languages, including an object oriented programming language such as Java, Smalltalk, C++ or the like and conventional procedural programming languages, such as the "C" programming language or similar programming languages.

Processing block 46 provides for receiving user input via a user interface of the device. The user input, which might be entered through a small and/or simple touch screen, button, microphone, etc., can be used to place the mobile device in a movement determination mode at block 48. Thus, the mobile device may be able to determine when the user has enabled time synchronization without continually monitoring the movement of the mobile device. If movement (e.g., shaking, bumping, tapping, etc., within a threshold range) is detected at block 50, a determination may be made at block 52 as to whether a time synchronization request has been received from another mobile device. As already noted, the time synchronization request frame can include information such as the address of the other mobile device, a broadcast address, a dialogue token, a ToD stamp, a user friendly name of the other mobile device (which may be output via the user interface of the local mobile device), a movement signature corresponding to a movement of the other mobile device, and so on.

If a time synchronization request has been received, illustrated block 54 identifies the source (e.g., other mobile device) of the request based on information in the request frame such as the transmitter address and/or the dialogue token. Block 54 can also confirm that there is a match between the movement signatures of the two devices. Moreover, the user friendly name of the other mobile device might be presented to the user of the local mobile device along with the option to accept or reject the synchronization request (e.g., "Accept synchronization request from Mike's camera?").

Block 56 can provide for imposing a random delay period before a reply is transmitted at block 58. As already noted, the reply frame may include information such as the address of the other mobile device, the address of the local mobile device, the dialogue token, a ToA stamp, a ToD stamp, a user friendly name of the local mobile device (which can be output via the user interface of the other mobile device), and a movement signature corresponding to the movement of the local mobile device. Thus, the transmitted reply can enable the other mobile device to calculate the clock offset between the two mobile devices and store the offset data in its internal memory.

The illustrated method 44 also provides for determining the clock offset at the local mobile device. Thus, if a time synchronization request has not been received at block 52, block 59 provides for waiting for expiration of a random delay period, wherein a time synchronization request can be transmitted at block 60. The time synchronization request frame can include information such as the address of the local mobile device, a broadcast address, a dialogue token, a ToD stamp, a user friendly name of the local mobile device (which may be output via the user interface of the other mobile device), a movement signature corresponding to a movement of the local mobile device, and so on, as already discussed.

If a reply to the request is detected before a timeout occurs at block 62, illustrated block 64 confirms that the movement signatures of the two mobile devices match, and determines the clock offset based on the reply. As already noted, the clock offset determination may involve a calculation using equation (1) above. The method 44 might be repeated periodically for multiple mobile devices and to resynchronize the devices in question.

If it is determined at block 62 that no reply has been received after a timeout has occurred, a determination can be made at block 61 as to whether a retry limit has been reached. If so, the illustrated method 44 returns to the movement determination at block 50. Otherwise, a time synchronization request may be re-transmitted at block 60, after the device waits for a random period, as already described.

Figure 4:
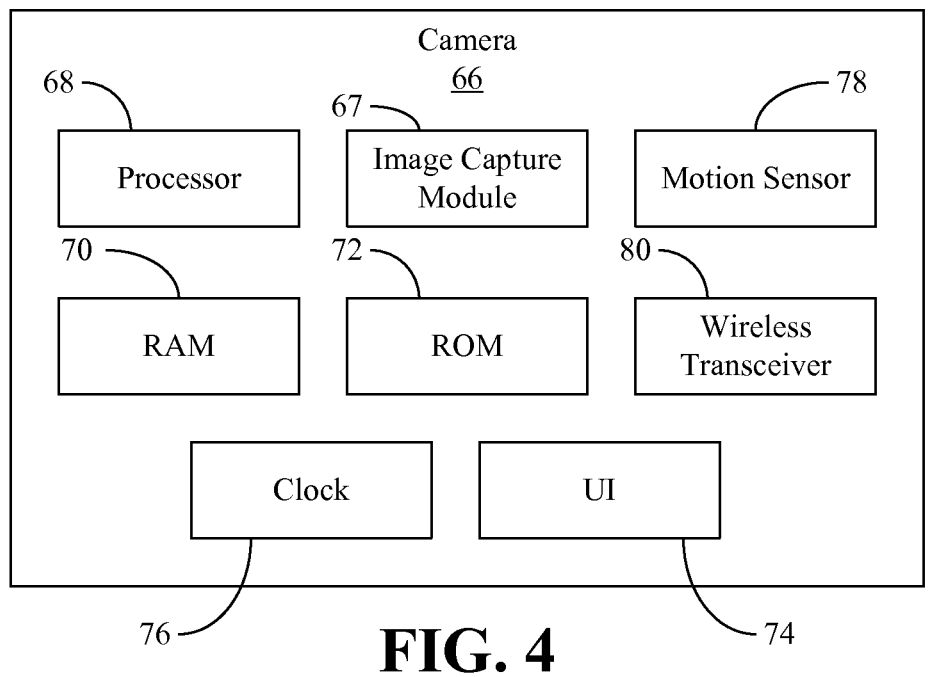
FIG. 4 is a block diagram of an example of a camera according to an embodiment.

FIG. 4 shows one example of a mobile device in which a camera 66 includes an image capture module 67, and a processor 68 that may include one or more processor cores (not shown), where each core may be fully functional with instruction fetch units, instruction decoders, level one (L1) cache, execution units, and so on, and can execute an operating system (OS), device drivers and various other software applications. The processor 68 may also execute time synchronization logic that enables the camera 66 to conduct time synchronizations with respect to a local clock 76 and the clocks of one or more other mobile devices (e.g., cameras) in response to a movement (e.g., shaking, bumping, tapping) of the camera 66.

In one example, a user of the camera 66 can place the camera in a movement determination mode via a relatively simple user interface (UI) 74, wherein in the movement determination mode causes a motion sensor 78 such as an accelerometer or a gyroscope to detect the movement in three dimensions and generate a signature of the movement. A wireless transceiver 80 may be used to transmit and receive time stamped synchronization requests/replies to and from other mobile devices, wherein the request/replies support determinations of clock offsets. The clock offsets might be stored locally in random access memory (RAM) 70, programmable ROM (PROM) 72, firmware, flash memory, etc. of the camera 66. The time synchronization logic might also be retrieved from the RAM 70, PROM 72, etc. of the camera 66 for execution by the processor 68, implemented in fixed-functionality hardware of the processor 68 or other microcontroller, or any combination thereof.

Figure 5:
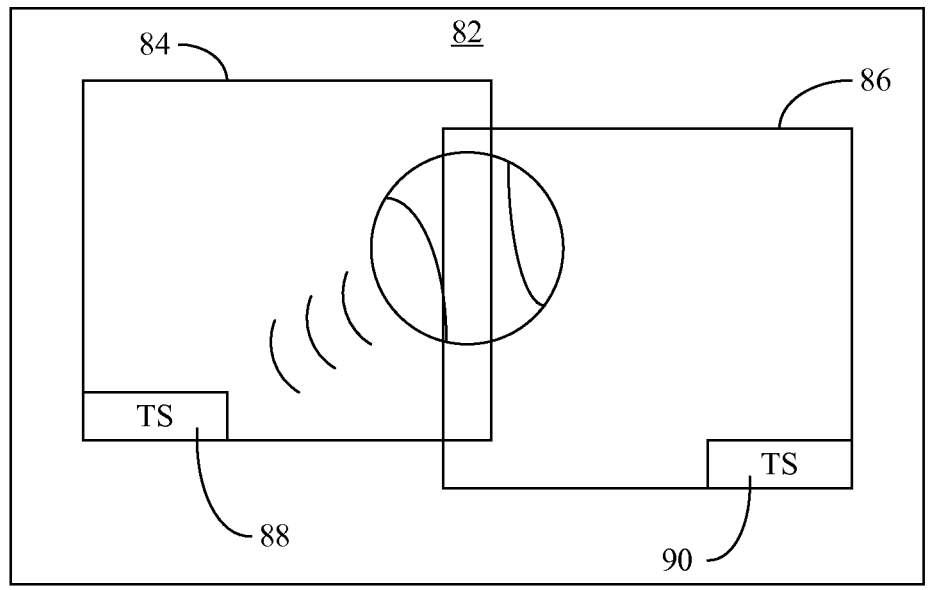
FIG. 5 is a diagram of an example of an image reconstruction according to an embodiment.

FIG. 5 shows a scene 82 having content that varies with time. In the illustrated example, a first image (still or video) 84 of the scene 82 is captured by a first camera, and a second image 86 of the scene 82 is captured by a second camera. If the cameras include time synchronization logic such as the time synchronization logic of camera 66 (FIG. 4), time stamps (TS) 88, 90 that take into account the clock offset between the two cameras can be applied to the images 84, 86 so that the time dependent scene may be reconstructed. For example, the time stamp 88 of the first image 84 might also identify the camera associated with the second image 86 as well as its clock offset with respect to the camera associated with the first image 84. A similar approach could be used for the time stamp 90 of the second image 84. The time synchronization logic might also be used to generate super resolution images, 3-D models, and so on.

Indeed, once the two cameras have been time synchronized in response to being bumped together (or similar movement), the first camera could send a wireless message to the second camera, instructing the second camera to take a picture at time instant T in the future. The second camera can respond with a wireless message confirming the plan to take the picture at time instant T. Upon taking the pictures at time instant T, both cameras might wirelessly exchange images so that they can each create a 3D construction.

Embodiments described herein are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a sensor to detect a movement of a first mobile device;
a synchronization module to:
conduct a time synchronization with respect to a second mobile device in response to the movement of the first mobile device, wherein the time synchronization is to be conducted without network infrastructure support at the first mobile device, and wherein one or more of a time synchronization request and a reply to the request is to be transmitted after expiration of a delay period when the movement is to be detected;
transmit the time synchronization request after expiration of the delay period when the time synchronization request is not received from the second mobile device;
receive the reply to the time synchronization request from the second mobile device; and
determine a clock offset between the first mobile device and the second mobile device based on the reply; and
an image capture module to capture an image and apply a time stamp to the image based on the time synchronization.

2. The system of claim 1, wherein the time synchronization request is to include at least in part a movement signature corresponding to the movement of the first mobile device.

3. The system of claim 1, wherein the synchronization module is to,
receive the time synchronization request from the second mobile device, and
transmit the reply to the time synchronization request after expiration of the delay period.

4. The system of claim 3, wherein the reply to the time synchronization request is to include at least in part a first movement signature corresponding to the movement of the first mobile device, the time synchronization request is to include a second movement signature corresponding to a movement of the second mobile device, and the synchronization is to transmit the reply if the first movement signature matches the second movement signature.

5. The system of claim 1, further including a user interface to receive a user input, the synchronization module to place the first mobile device in a movement determination mode in response to the user input.

6. An apparatus comprising:
a synchronization module to conduct a time synchronization with respect to a second mobile device in response to a detected movement of a first mobile device, wherein the time synchronization is to be conducted without network infrastructure support at the first mobile device, wherein one or more of a time synchronization request and a reply to the request is to be transmitted after expiration of a delay period when the movement is to be detected, and wherein the synchronization module is to transmit the time synchronization request after expiration of a random delay period when the time synchronization request is not received from the second mobile device, receive the reply to the time synchronization request from the second mobile device, and determine a clock offset between the first mobile device and the second mobile device based on the reply.

7. The apparatus of claim 6, wherein the time synchronization request is to include at least in part a movement signature corresponding to the movement of the first mobile device.

8. The apparatus of claim 6, wherein the synchronization module is to,
receive the time synchronization request from the second mobile device, and
transmit the reply to the time synchronization request after expiration of the delay period.

9. The apparatus of claim 8, wherein the reply to the time synchronization request is to include at least in part a first movement signature corresponding to the movement of the first mobile device.

10. The apparatus of claim 9, wherein the time synchronization request is to include a second movement signature corresponding to a movement of the second mobile device, and the synchronization module is to transmit the reply if the first movement signature matches the second movement signature.

11. The apparatus of claim 6, further including a user interface to receive a user input, the synchronization module to place the first mobile device in a movement determination mode in response to the user input.

12. A non-transitory computer readable storage medium comprising a set of instructions which, if executed by a processor, cause a first mobile device to:
detect a movement of the first mobile device;
conduct a time synchronization with respect to a second mobile device in response to the movement of the first mobile device, wherein the time synchronization is to be conducted without network infrastructure support at the first mobile device, and wherein one or more of a time synchronization request and a reply to the request is to be transmitted after expiration of a delay period when the movement is to be detected;
transmit the time synchronization request after expiration of the delay period when the time synchronization request is not received from the second mobile device;
receive the reply to the time synchronization request from the second mobile device; and
determine a clock offset between the first mobile device and the second mobile device based on the reply.

13. The computer readable storage medium of claim 12, wherein the time synchronization request is to include at least in part a movement signature corresponding to the movement of the first mobile device.

14. The computer readable storage medium of claim 12, wherein, if executed, the instructions cause the first mobile device to:
receive the time synchronization request from the second mobile device; and
transmit the reply to the time synchronization request after expiration of the delay period.

15. The computer readable storage medium of claim 14, wherein the reply to the time synchronization request is to include at least in part a first movement signature corresponding to the movement of the first mobile device.

16. The computer readable storage medium of claim 15, wherein the time synchronization request is to include a second movement signature corresponding to a movement of the second mobile device and, if executed, the instructions cause the first mobile device to transmit the reply if the first movement signature matches the second movement signature.

17. The computer readable storage medium of claim 12, wherein the instructions, if executed, place the first mobile device in a movement determination mode in response to a user input.

* * * * *